United States Patent
Scollon

(10) Patent No.: US 6,739,229 B2
(45) Date of Patent: May 25, 2004

(54) CABLE STRIPPING DEVICE

(76) Inventor: Thomas D. Scollon, 411 Gilham St., Philadelphia, PA (US) 19111

( * ) Notice: Subject to any disclaimer, the term of this patent is extended or adjusted under 35 U.S.C. 154(b) by 0 days.

(21) Appl. No.: 10/175,983

(22) Filed: Jun. 19, 2002

(65) Prior Publication Data

US 2003/0233752 A1 Dec. 25, 2003

(51) Int. Cl.$^7$ ................................................ B26D 1/16
(52) U.S. Cl. ............................ 83/444; 83/446; 83/947; 30/91.1
(58) Field of Search ............................ 83/947, 54, 490, 83/444, 445, 446; 30/90.4, 90.6, 90.7, 90.8, 91.1; 81/9.4, 9.41, 9.42, 9.43, 9.44, 9.51

(56) References Cited

U.S. PATENT DOCUMENTS

| | | | |
|---|---|---|---|
| 2,235,575 A | * 3/1941 | Edwards | .................... 30/91.1 |
| 2,452,734 A | * 11/1948 | Costelow | .................... 30/91.1 |
| 3,851,387 A | 12/1974 | Ducret | |
| 3,931,672 A | 1/1976 | Siden | |
| 4,127,937 A | * 12/1978 | Harless et al. | .................... 30/90.7 |
| 4,407,173 A | 10/1983 | Hendry | |
| 4,485,696 A | 12/1984 | Bieganski | |
| 4,543,717 A | 10/1985 | Luka | |
| 4,697,343 A | * 10/1987 | Collins | .................... 30/90.3 |
| 4,730,391 A | 3/1988 | Wood | |
| 4,945,788 A | 8/1990 | Matthews | |
| 4,977,671 A | 12/1990 | Ducret | |
| 5,469,762 A | 11/1995 | Krampe | |
| 5,542,327 A | * 8/1996 | Schultz | .................... 83/861 |
| 5,745,996 A | 5/1998 | Kenny et al. | |
| 5,809,652 A | * 9/1998 | Ducret | .................... 30/90.7 |
| 5,950,505 A | 9/1999 | Locher | |
| 5,988,018 A | 11/1999 | Tolbert et al. | |
| 6,044,744 A | * 4/2000 | Eslambolchi et al. | ......... 83/880 |
| 6,138,362 A | 10/2000 | Yoshimori | |
| 6,334,253 B1 | * 1/2002 | Cheng | .................... 30/90.7 |
| 2003/0188432 A1 | * 10/2003 | Temple | .................... 30/90.6 |

* cited by examiner

*Primary Examiner*—Kenneth E. Peterson
(74) *Attorney, Agent, or Firm*—Wolf, Block, Schorr and Solis-Cohen LLP; Robert F. Zielinski, Esq.

(57) ABSTRACT

A device is disclosed for stripping the insulation or dielectric housing from a cable or wire. The cable stripping device includes a wire guide block having a bore extending transversely therethrough and a slot which extends from an end of the block to the bore. An elongated holder is provided for receiving the wire guide block within a hollow portion of the holder. A rotary knife is disposed on a linkage assembly connected to the holder and is pivotable between an unengaged position to an engaged position, wherein the engaged position the blade extends through the slot and extends at least partially into the bore to engage with the cable or wire located within the bore, whereby in the engaged position, the knife blade is positioned to cut the insulation housing from the cable or wire as the cable or wire is pulled through the bore.

8 Claims, 2 Drawing Sheets

CABLE STRIPPING DEVICE

FIELD OF THE INVENTION

The invention relates to cutting devices, and more particularly to devices for stripping or cutting the insulation or dielectric material which surrounds the inner metallic conductor within a cable or wire.

BACKGROUND OF THE INVENTION

Presently, there is a significant demand for scrap copper and other metals which may be recycled and formed into other desirable products. One widely available source for scrap metal is contained in scraps of cable which, for a variety of reasons, are no longer useful. For example, a large number of pieces of copper wire are typically left over after wiring a house for high and low voltage transmission throughout the house.

If the metal conductor in the scrap cable is to be recycled, the insulation or dielectric material that surrounds the inner metallic conductor must be removed. In addition, many salvage yards require the insulation to be stripped from the conductor before it will be accepted for recycling. In order to strip the insulation from the metallic conductor, a wire stripping tool is typically employed. The wire stripping tools that are presently known for accomplishing this task range from sophisticated complicated machinery to simple hand tools.

A common element in most wire stripping devices is the blade that is necessary to split the insulation on the cable. However, these tools are often undesirable for quick and easy removal of vast amounts of insulation housing from large volumes of cable. For example, if sophisticated machinery is used to remove the insulation from the cable, the procedure tends to be expensive. The expense of this sophisticated machinery can also prevent their use in the field since such expense offsets the profit which can be obtained from the recycling process.

A further example of problems that arise is when hand tools are used to strip wire. Existing hand tools for stripping wire do not allow for a quick removal of the housing from the cable because precise adjustments that account for wire diameter and length must be made prior to removing the housing from a particular cable. Thus, a non-desirable amount of time may be required to remove the cable insulation.

Another disadvantage of using hand tools for removing insulation with large amounts of cable is safety. Safety is compromised when the user must manipulate a bladed hand tool in one hand and a cable in the other hand. This scenario requires significant coordination and thus, may be unsafe even for highly skilled users. a cable stripping tool is needed that is inexpensive, easy to operate, safe, and designed to quickly strip the insulation housing from large amounts of cable.

SUMMARY OF THE INVENTION

In accordance with the invention, a device is disclosed for stripping the insulation or dielectric housing from a cable or wire. The cable stripping device includes a wire guide block having a bore extending transversely therethrough and a slot which extends from one end or side of the block to the bore and a knife which is pivotable between an unengaged position to an engaged position. In the engaged position, the blade extends through the slot and extends at least partially into the bore to engage with the cable or wire located within the bore, whereby the knife is positioned to cut the insulation or dielectric housing from the cable or wire as the cable or wire is pulled through the bore.

In one aspect of the invention, the knife is a rotary knife.

In another aspect of the invention, the wire guide block includes a second bore that a different diameter, either smaller or larger, than the diameter of the first bore for accommodating and receiving a differently sized cable or wire.

The device may include an elongated holder for receiving the wire guide block within a hollow portion of the holder. A biasing device, such as a coil spring located within the hollow portion of the elongated holder, may be provided for biasing the wire guide block outwardly from the elongated holder. A travel limiting device may also be provided for limiting the extent of outward travel of wire guide block biased by the biasing device. The biasing device serves to facilitate engagement of the knife with the cable or wire within the bore.

In one aspect of the invention, the travel limiting device comprises a channel formed in either the wire guide block or the elongated holder and a set screw is located on the other part such that the set screw cooperates with the channel to limit the travel of the wire guide block within the hollow portion of the holder.

In one preferred embodiment the knife is pivotably disposed on a linkage assembly connected to the holder. The linkage assembly may include a clevis attached to the holder and a knife arm pivotably attached to the clevis at one of its end. The other end of the knife arm holds the knife blade and permits it to pivot into the bore.

In one form of the invention, a handle connected to the knife arm may be provided for increasing the leverage of a user to facilitate pivoting the knife arm between the unengaged and engaged positions. A knife guard located in proximity to the knife may also be provided for shielding the knife from the user.

In another aspect of the invention, a latching device may be provided for locking the knife in the engaged position. The latching device may include a latch having a detent. A rounded protrusion located on the device, such as on the clevis of holder, may also be provided to cooperate with the detent portion of the latch to engaged the detent to lock the knife arm in the engaged position. The latch may also include a camming surface which engages with the rounded to facilitate the engagement of the protrusion with the latch and to guide the protrusion into the detent.

It is therefore an object of the present invention to provide a device that facilitates cutting the insulation or dielectric housing surrounding the inner conductor of a cable or wire to facilitate the stripping the insulation from the metallic conductor to facilitate recycling of the conductor and disposal of the insulation.

Other objects and advantages of the invention will become apparent to those skilled in the art from the following detailed description, together with the drawings and the appended claims.

BRIEF DESCRIPTION OF THE DRAWINGS

For a more complete understanding of this invention, reference should now be made to the embodiment illustrated in greater detail in the accompanying drawing and described below. In the drawings.

DESCRIPTION OF THE PREFERRED EMBODIMENT

Reference will now be made to the accompanied drawings in which the various elements of the present invention have been given numeral designations.

Figure 1:
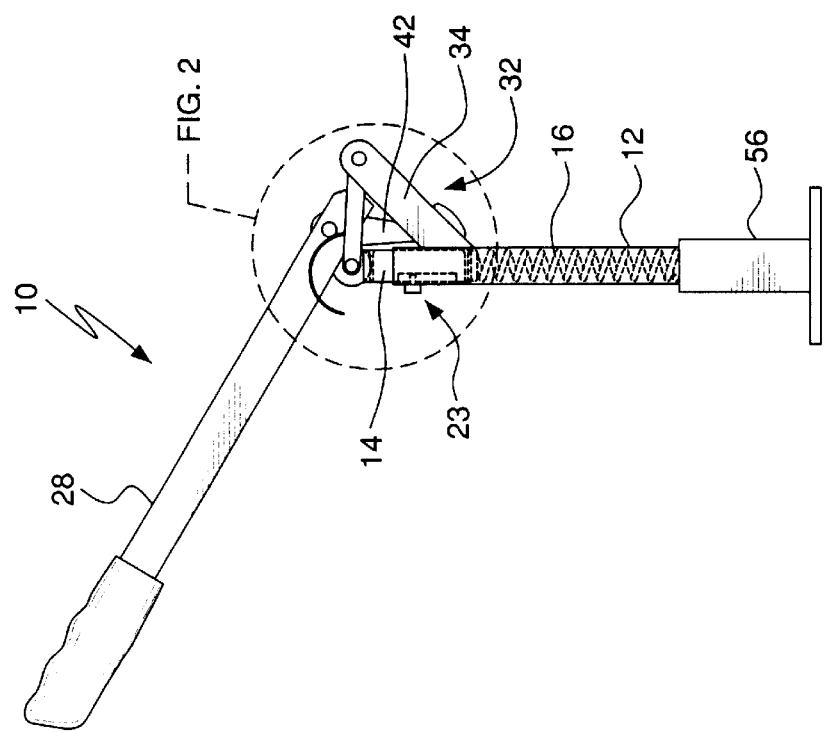
FIG. 1 is a side view of the cable stripping device of the present invention

In FIG. 1, there is shown a form of one embodiment of a cable stripper 10 that is presently preferred. The cable stripper 10 is intended to cut the surrounding insulation or dielectric housing from a cable so that the inner metallic conductor may be removed and recycled.

The cable stripper 10 includes an elongated tubular holder 14 which holds a cylindrical wire guide insert 14. The wire guide insert 14 is preferably formed from a durable plastic material, such as Teflon or polyesther.

Figure 2:
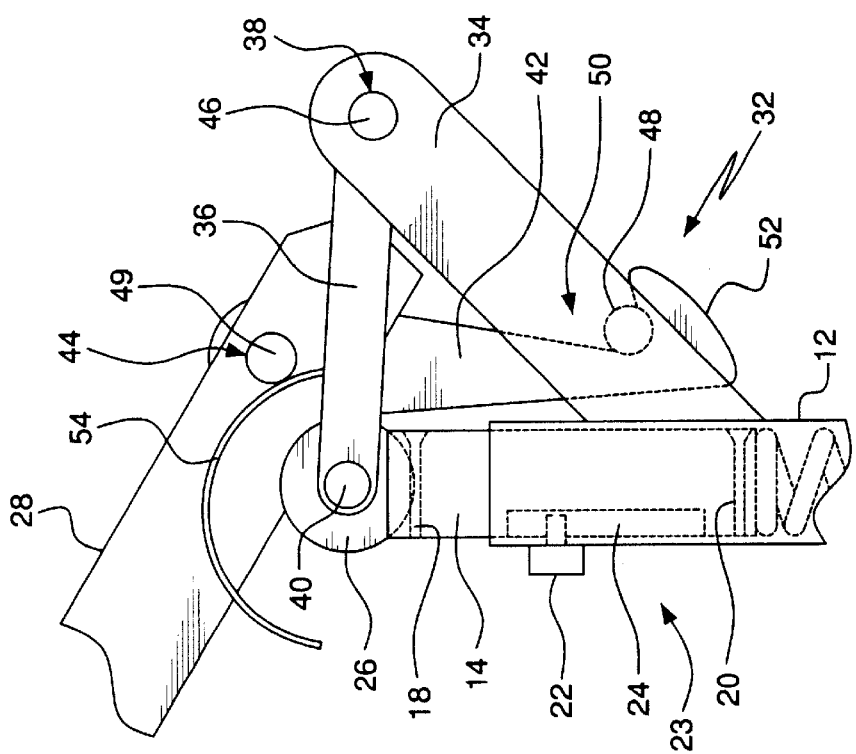
FIG. 2 is an enlarged view of the wire guide insert portion of the present invention.

Referring now to FIGS. 1 and 2, a biasing device, such as coil spring 16, is located within the hollow portion of the elongated holder 12 for biasing the wire guide insert 14 upwardly. It should be understood that other biasing devices may be substituted for the coil spring shown, such as a leaf spring, a spongy material, or the like.

A travel limiter 23 is provided to limit the travel of the wire guide insert 14 caused by the biasing device. The travel limiter includes a vertical channel 24 formed in the wire guide insert 14 and a set screw disposed at one end of the elongated holder 12. The set screw 22 and channel 24 coact to restrain the range of motion of the wire guide insert 14 against the force of the spring 16. It should be understood that the location of the set screw and channel may be reversed and that other travel limiters are all suitable for inclusion in the present invention. bore 18 is located at one end of the wire guide insert 14 for guiding an insulated wire or cable 100 therethrough. The back end of the bore 18 may be flared for facilitating the insertion of the cable into the bore as best seen in FIG. 2 Optionally, a second bore 20 may be provided at the other end of the wire guide insert 14. It is contemplated that the diameter of this second bore would be formed with a different sized diameter, either smaller or larger, than the diameter of the first bore, to accommodate larger or smaller diameter cables. It is further contemplated that additional inserts 14 may be provided to accommodate other cable sizes as necessary.

Figure 5:
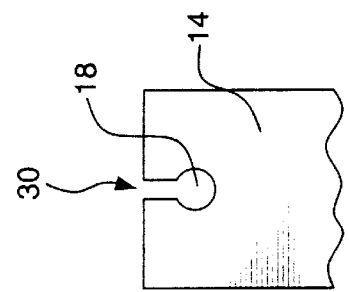
FIG. 5 is an enlarged front view of the top portion of the wire guide insert of the present invention.

Referring now to FIG. 5, a slot 30 is formed in the top end of the wire guide insert 14. The slot extends to the bore 18. It should be understood that an additional slot would be formed in the opposite end of the guide 14 to connect to the optional second bore 20. The function of the slot 30 is described in greater detail below.

As best seen in FIG. 1, a linkage assembly 32 is provided for holding a knife blade holder arm 36. A handle 28 is attached to the bar 36 to assist the user in rotating the arm 36 and for effecting the cutting of the cable/wire 100. The linkage assembly 32 includes an clevis 34 which protrudes at an angle from one side of the elongated holder 12. The arm 36 is rotatably mounted to the clevis 34 at pivot point 38 (such as clevis pin 46). A rotary knife/cutting wheel blade 26 is rotatably mounted at the other end of the arm 36 at pivot point 40. The arm 36 is sized so that the rotary knife blade 26 can be rotated into the slot 30 formed in the top of the wire guide insert 14 so that the blade of the cutting wheel 26 is located the uppermost bore 18. Thus, it should be understood that the longitudinal axis of the slot 30 is perpendicular to the axis of rotation of the rotary knife blade 26.

Figure 4:
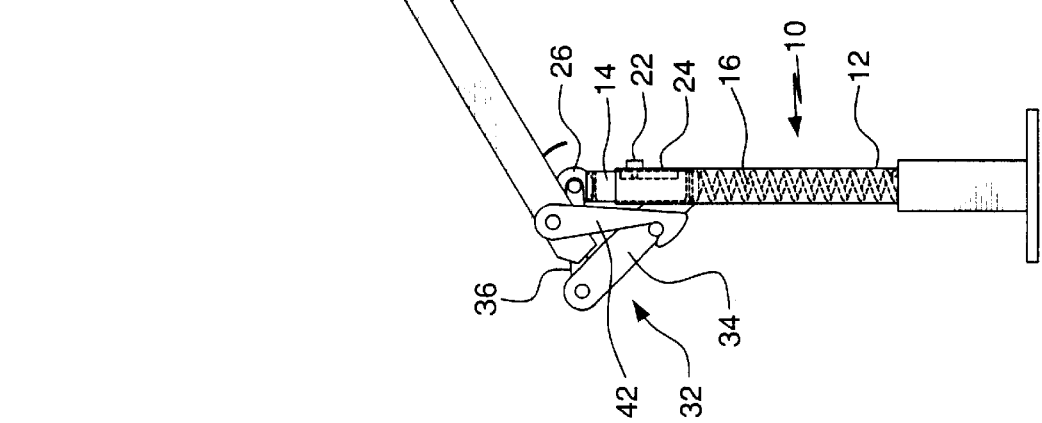
FIG. 4 is a side view of the cable stripping device of the present invention shown with a knife arm in the engaged position.
Figure 3:
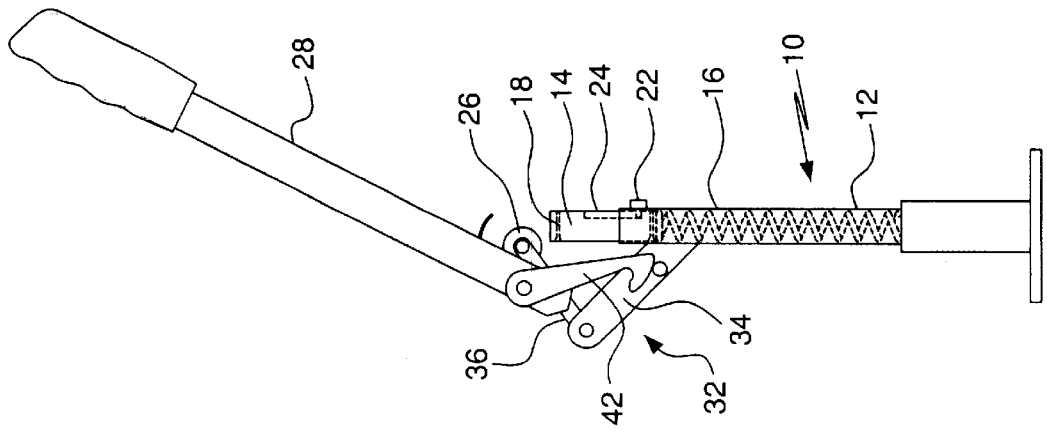
FIG. 3 is a side view of the cable stripping device of the present invention shown with a knife arm in the unengaged position.

When the knife blade 26 is within the bore 18, the knife blade is said to be in the engaged position. The engaged position of the device is shown in FIG. 4. Similarly, when the knife blade 26 is out of the bore 18, it is in an unengaged position. One unengaged position of the device is shown in FIG. 3.

An elongated handle 28 is attached to the cutter holding arm 36 at one end to increase leverage and effect the manual rotation of the knife blade arm 36 by the user as described above.

A latch 42 is connected to the pivot point 44 (such as pin 49) on the handle 28 via a screw 46. A detent 50 is located on the other end of the latch 42. The detent 50 is located and sized to interact with a rounded protrusion 48 located on one end of the clevis 34. One end of the latch 42 is provided with an inclined camming surface 52 for allowing the latch to pass over the rounded protrusion 48 so that it may interact with the detent 50. As best seen in FIGS. 3 and 4, when the handle 28 is rotated downwardly, the rounded protrusion 48 passes over and is guided by the inclined camming surface 52 until the rounded protrusion 48 falls into the cut out area of the detent 50. When the protrusion 48 is within the detent 50 portion of the latch 42, the knife blade 26 is locked in the engaged position (FIG. 4).

A knife guard 54, as best seen in FIG. 2, is also located on the handle 28 to prevent inadvertently cutting the user of the cutting device 10.

In operation, a user threads an insulated single conductor cable 100 through the first bore 18 of the wire guide insert 14 so it is in position for cutting (the engaged position of FIG. 4). The user then rotates the handle 28 and thereby rotates the rotary knife 26 into the slot 30 and into the first bore 18 and the cable 100 therein. The size and design of the blade 26 and bore 18 is such that the knife blade is capable of slicing through the insulation housing of the cable 100, but not through the metallic center conductor.

As the user rotates the handle 28 from the unengaged to the engaged position, the camming surface 52 of the latch 42 makes contact with the rounded protrusion 48. See FIG. 3. The contact of the camming surface 52 and the protrusion 48, force the latch 42 to rotate until the protrusion reached the end of the camming surface 52 (at the end of the hooked end of the latch) until the protrusion 48 falls into the detent 50 portion of the latch 42. The outward bias of the top end of the wire guide insert 14 caused by the spring 16 acts upon the knife blade arm 36, pushing it upwardly. This upward bias traps the rounded protrusion 48 in the hooked-shaped detent 50 of the latch and locks the knife in the engaged position of FIG. 4

At this point, a user merely has to pull on the cable 100, pulling it through the first bore 18, whereupon the rotary knife 26 will cut into the dielectric or insulation housing of the cable 100 and slice the dielectric/insulation down its length. Once sliced, the copper or metal conductor of the cable can be separated from the insulation/dielectric and can be recycled and the insulation can be otherwise disposed of easily.

A base portion 56 may be included for receiving the elongated holder 12 and holding it in an upright position for use. It should be understood that the base can include a vise (not shown) or other securing holding means for securely attaching the device to a table or workbench during use and prevent its toppling over from the lateral force applied by the user pulling the cable therethrough.

While certain preferred embodiments and various modifications thereto have been described or suggested, other changes in these preferred embodiments will occur to those of ordinary skill in the art which do not depart from the broad inventive concepts of the present invention. Accordingly, reference should be made to the appended claims rather than the specific embodiment of the foregoing specification to ascertain the full scope of the present invention.

What is claimed is:

1. A device for stripping insulation or dielectric housing from a cable or wire comprising:
   a wire guide block having a bore extending transversely therethrough and a slot which extends from an end of the block to the bore;
   a knife blade which is pivotable between an unengaged position to an engaged position, wherein in the engaged position the knife blade extends through the slot and extends at least partially into the bore to engage with the cable or wire located within the bore, whereby in the engaged position, the knife is positioned to cut the insulation or dielectric housing from the cable or wire as the cable or wire is pulled through the bore;
   an elongated holder for receiving the wire guide block within a hollow portion of the holder;
   a biasing device for biasing the wire guide block outwardly from the elongated holder, and
   a travel limiting device for limiting the extent of outward travel of the wire guide block by the biasing device, whereby the biasing device serves to facilitate engagement of the knife blade with the cable or wire within the bore.

2. The cable stripping device according to claim 1, wherein the biasing device is a coil spring located within the hollow portion of the elongated holder; and
   the travel limiting device comprises a channel formed in one of the wire guide block and elongated holder and a set screw located within the other of the wire guide block and the elongated holder, whereby the set screw cooperates with the channel to limit the travel of the wire guide block within the hollow portion of the holder.

3. A device for stripping insulation or dielectric housing from a cable or wire comprising:
   a wire guide block having a bore extending transversely therethrough and a slot which extends from an end of the block to the bore;
   an elongated holder for receiving the wire guide block within a hollow portion of the holder;
   a rotary knife blade which is disposed on a linkage assembly connected to the holder and is pivotable between an unengaged position and an engaged position, wherein in the engaged position the blade extends through the slot and extends at least partially into the bore to engage with the cable or wire located within the bore;
   a spring for biasing the wire guide block outwardly from the elongated holder;
   a travel limiter device for limiting the extent of outward travel of the wire guide block by the spring, whereby the spring serves to facilitate engagement of the knife blade with the cable or wire within the bore; and
   a latch having a detent, the latch cooperating with a rounded protrusion which engages the detent to lock the knife in the engaged position;
   whereby in the engaged position, the knife blade is positioned to cut the insulation or dielectric housing from the cable or wire as the cable or wire is pulled through the bore.

4. The cable stripping device according to claim 3 wherein the wire guide block further comprises a second bore having a different diameter than the diameter of the first bore for receiving a differently sized cable or wire.

5. The cable stripping device according to claim 3 wherein the linkage assembly comprises:
   a clevis attached to the holder; and
   a knife arm pivotably attached to the clevis at one end, the other end of the knife arm holding the knife blade and permitting the knife blade to pivot into the bore.

6. The cable stripping device according to claim 5, further comprising a handle connected to the knife arm for increasing the leverage of a user to facilitate pivoting the knife blade between the unengaged and engaged positions.

7. The cable stripping device according to claim 3, further comprising a knife guard located in proximity to the knife blade for shielding the knife blade from the user.

8. The cable stripping device according to claim 3, wherein the latch further comprises a camming surface which engages with the rounded protrusion to facilitate the engagement of the protrusion with the latch.

* * * * *